(12) United States Patent
Kampmann et al.

(10) Patent No.: US 8,408,033 B2
(45) Date of Patent: Apr. 2, 2013

(54) AUTOFRETTAGE PROCESS AND AUTOFRETTAGE APPARATUS

(75) Inventors: Bernd Kampmann, Velbert (DE); Jochen Diemer, Nordhausen (DE)

(73) Assignee: Maximator GmbH, Zorge (DE)

( * ) Notice: Subject to any disclaimer, the term of this patent is extended or adjusted under 35 U.S.C. 154(b) by 960 days.

(21) Appl. No.: 12/376,356

(22) PCT Filed: Aug. 7, 2007

(86) PCT No.: PCT/DE2007/001409
§ 371 (c)(1),
(2), (4) Date: Feb. 4, 2009

(87) PCT Pub. No.: WO2008/058494
PCT Pub. Date: May 22, 2008

(65) Prior Publication Data
US 2010/0154501 A1  Jun. 24, 2010

(30) Foreign Application Priority Data
Nov. 16, 2006 (DE) .................. 10 2006 054 440

(51) Int. Cl.
*B21D 26/02* (2011.01)
*B21D 26/033* (2011.01)

(52) U.S. Cl. .................... 72/58; 72/57; 72/54

(58) Field of Classification Search .......... 72/54, 55, 72/60, 706, 453.12, 453.11, 453.01, 61, 62, 72/57, 58; 29/421.11, 421.12
See application file for complete search history.

(56) References Cited

U.S. PATENT DOCUMENTS

| 3,577,590 A * | 5/1971 | Dawson et al. ................ 425/77 |
| 3,625,040 A * | 12/1971 | DeGain ........................... 72/62 |
| 4,788,843 A * | 12/1988 | Seaman et al. ................... 72/58 |
| 5,605,449 A * | 2/1997 | Reed .............................. 417/454 |

FOREIGN PATENT DOCUMENTS

| DE | 37 16 176 A1 | 9/1988 |
| DE | 41 15 284 A1 | 11/1992 |
| JP | 57 168864 A | 10/1982 |

* cited by examiner

*Primary Examiner* — Dana Ross
*Assistant Examiner* — Pradeep C Battula
(74) *Attorney, Agent, or Firm* — Henry M. Feiereisen LLC

(57) ABSTRACT

In the autofrettage process, a thick-walled workpiece (2) to undergo autofrettage is positioned in an autofrettage apparatus (1). The interior space (5) of the workpiece (2) is filled with a fluid and closed so as to be pressure-tight. The volume available to the fluid in the interior space (5) of the workpiece (2) is reduced by a displacement piston (19) which is moved into the interior space (5) of the workpiece (2) through a displacement piston opening (6) of the workpiece (2). The pressure is therefore generated in the interior space (5) of the workpiece (2).

7 Claims, 3 Drawing Sheets

AUTOFRETTAGE PROCESS AND AUTOFRETTAGE APPARATUS

BACKGROUND OF THE INVENTION

The invention relates to a process for autofrettage of thick-walled workpieces according to the features in the preamble of claim 1 and a device for carrying out the process.

Autofrettage refers to a process for increasing the static and dynamic load of thick-walled components that are subjected to an interior pressure. With this process, internal compressive stresses are intentionally built up by applying a stretching pressure that far exceeds the operating pressure, and wherein the yield strength of the material is partially exceeded. Partial regions of the material are permanently plastically deformed under the high pressure, whereas the exterior regions of the workpiece are only elastically deformed. This produces a pretension inside the workpiece and not only improves the operating strength, but preferably produces high-yield-strength components with a long service life, as required in particular for diesel injection. The so-called common rails, i.e., recently developed fuel distribution rails, are exposed to pressures in the order of 200 MPa and above during normal operation. The same applies to lines carrying fuel in the vicinity of the common rail and to connected injectors.

Typically, during autofrettage, a high-pressure fluid is introduced into the workpiece to be treated and exposed to high-pressure, wherein a pressure generator arranged outside the workpiece compresses the high-pressure fluid which is in fluid-connection with the interior of the workpiece via a connecting line. Typically, pressure boosters with a high transmission ratio are employed. For example, the transmission ratio, which can be set equal to the ratio of the diameters of the pistons of the pressure booster, can be greater than 1:30. Because pressure of several hundred MPa is applied on the high-pressure side, particular measures must be taken in order to ensure fluid-tightness of all components of the assembly, in particular the high-pressure piston. This is accomplished by guiding the high-pressure piston in a high-pressure cylinder which is made, for example, of a hard metal. Hard metals are brittle due to their high hardness and are sensitive to impact and shock loads. The high pressure cylinders made of a hard metal are therefore surrounded by additional thick-walled steel cylinders, which also pretensioned so as to be able to absorb the high forces in the high-pressure regime. This design increases the cost of the high-pressure cylinder, in particular because a hard metal cylinder representing a hard metal component is difficult to machine and also has a relatively large volume. It is also difficult to couple the hard metal cylinder to the component for the autofrettage process, because the lines from the high-pressure cylinder into the interior space of the workpiece must also be able to withstand the high pressures. Corresponding seals need to be provided, so that the entire structure becomes very complex. All components exposed to high-pressure, including the high-pressure cylinder, are basically subjected to wear and must therefore be exchanged sooner or later.

DE 41 15 284 A1 describes an autofrettage apparatus for pipes having two holders adapted to receive a pipe. In this apparatus, an arbor is provided that can be inserted into the pipe and has sealing elements for sealing an annular space located between the arbor and the interior wall of the pipe that is exposed to the pressurizing means. The pressurizing means are supplied through an arbor holder receiving the arbor. The arbor is provided to reduce the quantity of pressurizing means required for autofrettage by the constant volume corresponding to the arbor volume.

SUMMARY OF THE INVENTION

Based on this concept, it is an object of the invention to provide an autofrettage process and a suitable autofrettage apparatus which reduce wear-related costs.

According to one aspect of the invention, the object is attained with an autofrettage process wherein a thick-walled workpiece to undergo autofrettage is positioned in an autofrettage apparatus, wherein the interior space of the workpiece is filled with a fluid and sealed pressure-tight, wherein the volume available to the fluid in the interior space is reduced with at least one displacement piston, which is moved through a displacement piston opening of the workpiece into the interior space of the workpiece.

According to one aspect of the invention, the object is attained with an autofrettage apparatus, with means for filling an interior space of a workpiece that is to undergo autofrettage with a fluid, with a means for pressure-tight sealing of the interior space and with means for producing pressure in the interior space of the workpiece, wherein the volume available to the fluid in the interior space can be reduced with at least one displacement piston, which can be moved into the interior space of the workpiece through a displacement piston opening (6) of the workpiece.

Advantageous modifications embodying the inventive concept are recited in the dependent claims.

The invention is based on the idea that, if possible, no pipes and hence the least number of components subject to wear should be placed between the high-pressure region and the workpiece to be filled, so that the corresponding apparatus has the smallest possible number of components subject to wear. With the proposed solution, the high-pressure fluid is not pretensioned outside the workpiece undergoing autofrettage, but rather inside the workpiece undergoing autofrettage. This is attained by reducing the volume available to the fluid in the interior space with at least one displacement piston, which is moved into the interior space of the workpiece through a displacement piston opening disposed in the workpiece. In this process, the interior space of the component is filled first with the high-pressure fluid and closed off. The region to which pressure is applied is then almost entirely confined to the interior space of the workpiece, which is continuously reduced in the course of the process in order to establish the high-pressure required for autofrettage. It is important to understand that the workpiece is not operating as a cylinder for the displacement piston, in which the displacement piston is guided, but that the workpiece has an inside diameter that is greater than the outside diameter of the displacement piston. Only this arrangement ensures that the entire interior surface of the workpiece is subjected to autofrettage.

In an advantageous embodiment, the workpiece is filled with the high-pressure fluid through a pre-fill opening. The workpiece hence has an additional opening which is preferably arranged opposite the displacement piston opening of the workpiece. Filling through a separate opening makes it possible to introduce the high-pressure fluid into the interior space via a fill fitting with relatively large cross-section, i.e., the interior space can be filled quickly. This can further reduce the cycle time of this discontinuous fabrication process.

It is an important feature of the process that the displacement piston opening of the workpiece is sealed by a sealing cone which is pressed against the edge of the displacement piston opening. The sealing cone can be part of a high-pressure cylinder in which the displacement piston is guided. This eliminates the need for separate adapter plates which have been required to date between the pressure generator and the workpiece undergoing autofrettage. Basically, the sealing cone can also be implemented as a separate component which can then be exchanged individually. Sealing is attained in a positive and nonpositive way by direct metallic contact between the workpiece and the sealing seat. This assumes that the sealing seat matches the geometry of the workpiece. The sealing seat can therefore have the shape of a tip of a cone or a sphere. The desired fluid-tightness is an important factor when selecting the geometry of the sealing seat.

With the process of the invention, fluid-tightness can be guaranteed because the force, by which the opposing openings are closed, increases proportional to the autofrettage pressure. If the displacement piston opening and the separate pre-fill fitting are not in direct opposition, then corresponding support devices may be provided for the workpiece for sealing the interior space for autofrettage.

In the same manner as the displacement piston opening is sealed by a sealing cone, the pre-fill opening may also be closed off, for example by a closure piston which preferably also have a cone-shaped or rounded tip. The closure piston itself engages therefore only slightly into the interior space of the workpiece. The closure piston itself needs to seal the interior space only when the interior space contains the desired quantity of high-pressure fluid.

When the interior space is being filled, all gases are removed from the interior space as completely as possible. The interior space must therefore be open in the region of the displacement piston opening during filling. Advantageously, the pre-fill opening may be located below the displacement piston opening, so that the workpiece can be filled from below. Before the high-pressure fluid is introduced, a sealing sleeve is pressed against the flange face of the workpiece. This sealing sleeve surrounds the closure piston and is sealed with against the flange face of the workplace by a sealing ring disposed at one end and against the outside periphery of the closure piston by an additional sealing ring.

With the process of the invention, the workpiece is first placed in a clamping and positioning device, either manually or with the help of a robot. The sealing sleeve must then be pressed from below against the workpiece. This can be done by moving the closure piston towards the pre-fill fitting, with the sealing sleeve being carried along. The sealing sleeve is supported on the closure piston by a spring. The spring is upset until sufficient pretension is achieved so as to ensure a reliable seal when the workpiece is filled. The displacement piston opening in the workpiece remains open during this operation. After the workpiece is sealed along the periphery of the pre-fill fitting, the high-pressure fluid can be introduced into the workpiece through a fill fitting in the sealing sleeve. Air is vented from the region of the displacement piston opening, until the high-pressure fluid flows out of the displacement piston opening of the workpiece at the top.

To prevent the high-pressure fluid from uncontrollably flowing out of the displacement piston opening when filling the interior space, a sealing sleeve can also be provided in the region of this opening, in the same manner as on the pre-fill fitting. Excess high-pressure fluid flows into the top sealing sleeve, from where it is controllably discharged.

After the filling operation is concluded, the conical sealing tip of the closure piston can be inserted in the pre-fill fitting, providing a high-pressure seal. At the same time, the workpiece is raised further and pressed against the conical sealing cone of the high-pressure cylinder. The interior space of the component is now sealed, and ready for application of the interior pressure.

The displacement piston is now moved with an additional hydraulic cylinder into the interior space of the workpiece, reducing the volume available to the high-pressure fluids, with the result that the fluid pressure increases to several hundred MPa. At this point, the actual autofrettage begins.

After the autofrettage pressure is reached in the workpiece, the pressure is reduced by retracting the displacement piston from the workpiece with the hydraulic cylinder that is fixedly connected with the displacement piston, until the pressure is approximately equal to the ambient air pressure. The closure piston is then retracted again, so that both openings of the interior space are once more open. When the closure piston is retracted, the sealing sleeve is also carried along into the initial position due to friction of the seal.

At the end of the treatment cycle, the displacement piston and the closure piston, including the sealing sleeve, are again in the initial position. The treated workpiece can then be removed and the process begins again from the start.

The process of the invention attempts to keep the volume for the high-pressure fluid as small as possible. The process can then be performed faster. In addition, the wear parts of this type of autofrettage apparatus which need to be replaced sooner or later, can be made significantly smaller than with conventional autofrettage apparatuses where the desired pressure is build up outside the workpiece. It will be understood that the displacement piston need not extend through the entire length of the workpiece, but can be sized so that the desired result of the process is attained with the smallest volume of high-pressure fluid and also the smallest possible stroke. It would also be possible within the context of the invention to reduce the volume of high-pressure fluid by introducing into the interior space displacement elements in form of metallic inserts having a constant volume. Such inserts may have a flexible shape, which may be advantageous for example with curved fuel lines. The process of the invention may be employed, in particular, for autofrettage of fuel-carrying components. Concrete examples are autofrettage of common rails, because these are thick-walled straight workpieces which must be able to withstand particularly high pressures. Of course, the process may also be employed for autofrettage of fuel injectors as well as for autofrettage of fuel-carrying lines and for autofrettage of pressurized components in fuel injectors.

BRIEF DESCRIPTION OF THE DRAWING

The invention will now be described in more detail with reference to an exemplary embodiment illustrated in the drawings.

DETAILED DESCRIPTION OF PREFERRED EMBODIMENTS

Figure 1:
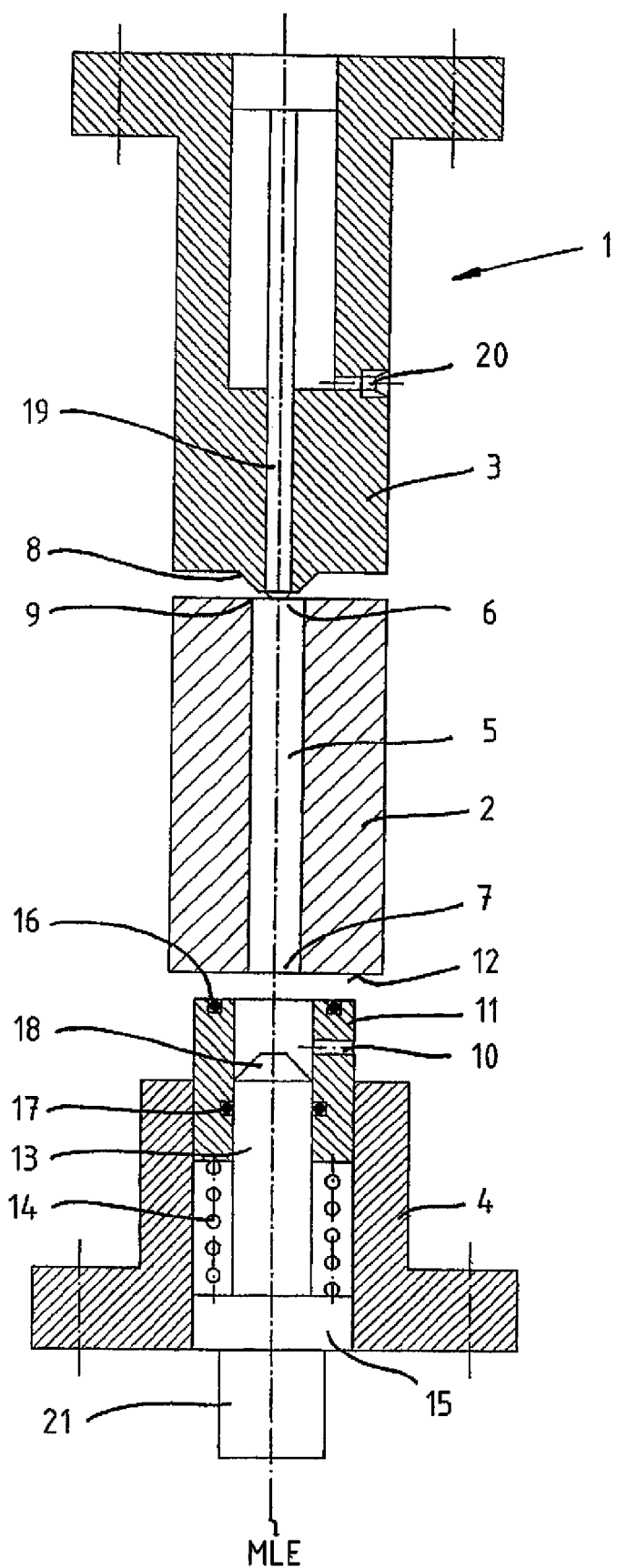
FIG. 1 shows a schematic diagram of an autofrettage apparatus in a longitudinal cross-section in an initial position.

FIG. 1 shows an autofrettage apparatus 1 for autofrettage of a thick-walled workpiece 2, for example a common rail. The workpiece 2 is here placed between a high-pressure cylinder 3 and a closure cylinder 4. The longitudinal center axis MLE of the high-pressure cylinder 3, the workpiece 2 and the closure cylinder 4 is in alignment.

Figure 2:
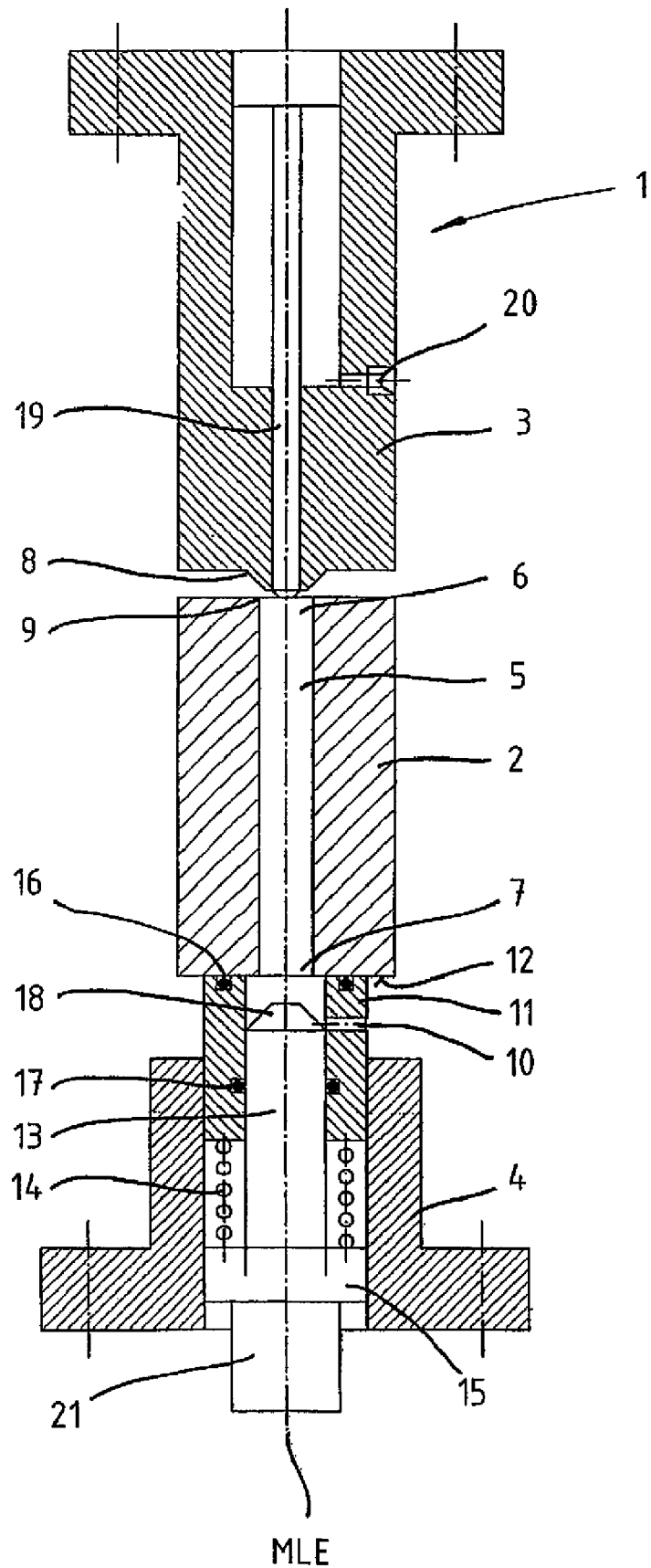
FIG. 2 shows the autofrettage apparatus of FIG. 1 after conclusion of the filling operation.

It is evident that the workpiece 2 has an interior space 5 in form of a bore, wherein the top mouth in the image plane is referred to as displacement piston opening 6 and the bottom opening as pre-fill opening 7. As seen in the following Figures, the displacement piston opening 6 and the pre-fill opening 7 are sealed by corresponding sealing cones. A first sealing cone 8 is part of the high-pressure cylinder 3 and is pressed against the displacement piston opening 6 for closing the opening 6. However, before the displacement piston opening 6 is closed, a high-pressure fluid (not shown in detail) must be introduced in the interior space 5. This is done through a fill fitting 10 which is disposed radially in a sealing sleeve 11. However, before the high-pressure fluid is introduced into the interior space 5 through the fill fitting 10, the sealing sleeve 11 must be moved against a flange face 12 of the workpiece 2, as illustrated in FIG. 2. This is done with the help of a closure piston 13 arranged inside the sealing sleeve 11. The sealing sleeve 11 is supported on a shoulder 15 of the closure piston 13 by a spring 14, so that the sealing sleeve 11 is pressed against the flange face 12 of the workpiece 2 with an interposed sealing ring 16 at the end, thereby providing a seal. Just enough high-pressure fluid is introduced into the interior space 5 to exit at the displacement piston opening 6. The closure piston 13 which is sealed via a sealing ring 17 received in the sealing sleeve 11 is pressed against the pre-fill fitting 7 and closes the fitting 7 off with its cone-shaped sealing tip 18. At the same time, the upper end of the interior space 5 is sealed by pressing the sealing cone 8 of the high-pressure cylinder 3 against the edge 9 of the workpiece 2. Pressure is then applied to the high-pressure fluid by reducing with a displacement piston 19 the volume available to the high-pressure fluid in the interior space 5.

Figure 3:
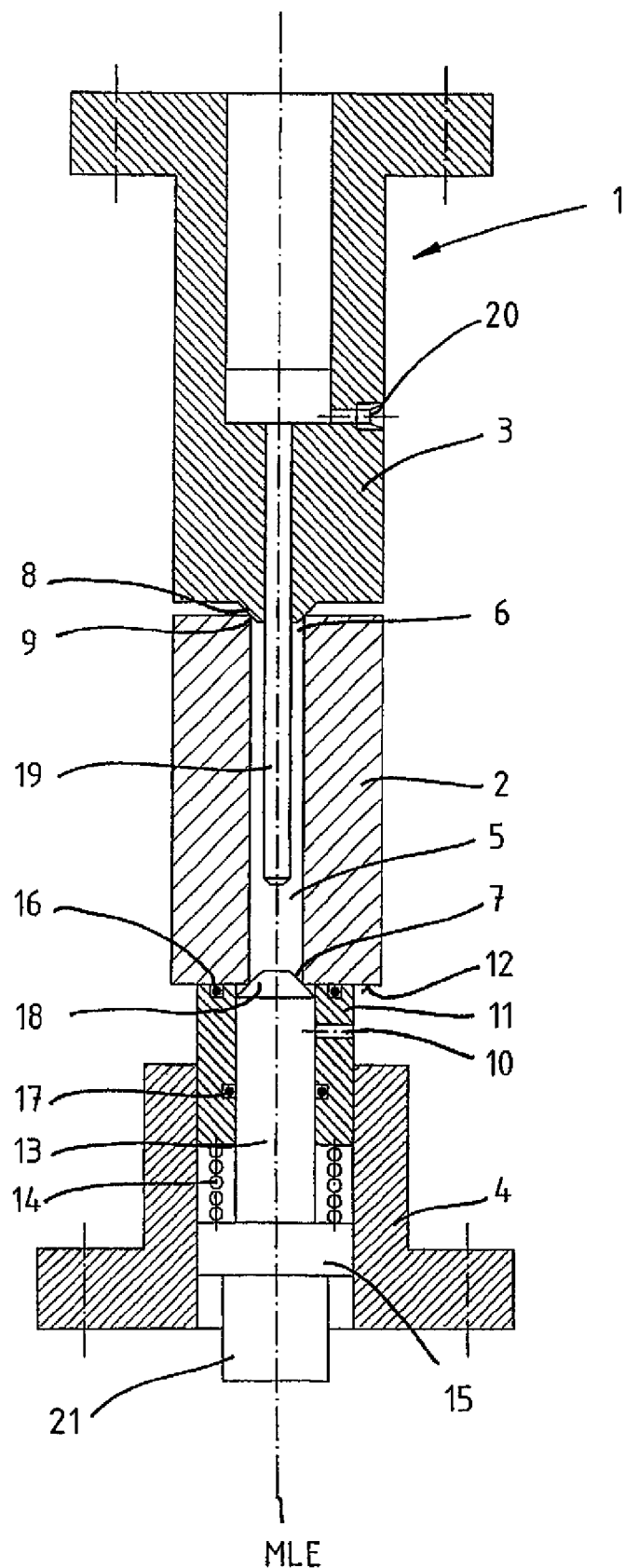
FIG. 3 shows the autofrettage apparatus when high-pressure is applied to the workpiece.

FIG. 3 shows how the arbor-shaped displacement piston 19 is moved through the sealing cone 8 into the interior space 5. The high-pressure fluid in the interior space 5 is hereby compressed to a point where pressures of several hundred MPa build up in the interior space, which causes autofrettage of the workpiece 2. The displacement piston 19 is coupled to a hydraulic cylinder (not shown in detail) which establishes the required autofrettage pressure with a lower pressure on a piston surface. The piston surface is greater than the cross-sectional surface of the displacement piston 19. A leakage fitting 20 is provided to allow discharge of leakage flows.

In the same fashion as the displacement piston 19 is hydraulically displaced, a schematically indicated hydraulic cylinder 21, which is fixedly connected with the closure piston 13, is also in engagement with the closure piston 13.

What is claimed is:

1. An autofrettage process, wherein interior regions of a workpiece are permanently plastically deformed under high pressure, whereas exterior regions of the workpiece are only elastically deformed, the process comprising the steps of:

placing a workpiece having an interior space and a displacement piston opening in an autofrettage apparatus, filling the interior space of the workpiece from below with a fluid through a pre-fill opening, closing the pre-fill opening with a closure piston, venting air from a region of the displacement piston opening, until the fluid flows out of the displacement piston opening of the workpiece disposed at a top of the workpiece, sealing the interior space of the workpiece by pressing a sealing sleeve surrounding the closure piston against a flange face of the workpiece so as to be pressure-tight, and advancing a displacement piston through the displacement piston opening into the interior space of the workpiece to reduce a volume available to the fluid in the interior space.

2. The autofrettage process of claim 1, wherein the displacement piston opening is sealed by a sealing cone which is pressed against an edge of the displacement piston opening.

3. The autofrettage process of claim 1, wherein the sealing sleeve is pressed against the flange face by the closure piston using a spring.

4. The autofrettage process of claim 3, wherein a periphery of the closure piston is sealed against the sealing sleeve by a sealing ring, wherein the sealing sleeve is carried along by the closure piston through friction from the sealing ring.

5. The autofrettage process of claim 1, wherein the displacement piston opening and the pre-fill opening are located opposite one another, wherein a force closing the opposing openings increases proportional to an autofrettage pressure applied by advancing the displacement piston.

6. The autofrettage process of claim 1, further comprising the steps of:

retracting the displacement piston from the workpiece, after reaching an autofrettage pressure, until a pressure in the interior space is approximately identical to ambient pressure, lifting the sealing cone from the displacement piston opening, lifting the closure piston from the pre-fill opening, and lifting the sealing sleeve from the flange face, and removing the workpiece that underwent autofrettage from the apparatus.

7. The autofrettage process of claim 1, wherein the workpiece is a component that carries fuel.

\* \* \* \* \*